(12) United States Patent
Takasumi (10) Patent No.: US 10,841,550 B2
(45) Date of Patent: Nov. 17, 2020

(54) IMAGING APPARATUS AND METHOD OF CALCULATING WHITE BALANCE GAIN

(71) Applicant: Olympus Corporation, Hachioji (JP)

(72) Inventor: Shinya Takasumi, Tokyo (JP)

(73) Assignee: Olympus Corporation, Tokyo (JP)

( * ) Notice: Subject to any disclaimer, the term of this patent is extended or adjusted under 35 U.S.C. 154(b) by 22 days.

(21) Appl. No.: 16/412,188

(22) Filed: May 14, 2019

(65) Prior Publication Data
US 2019/0356892 A1   Nov. 21, 2019

(30) Foreign Application Priority Data

May 21, 2018   (JP) .................................. 2018-097141

(51) Int. Cl.
*H04N 9/73*    (2006.01)
*H04N 9/07*    (2006.01)

(52) U.S. Cl.
CPC ............... *H04N 9/735* (2013.01); *H04N 9/07* (2013.01)

(58) Field of Classification Search
CPC .... H04N 9/735; H04N 9/643; H04N 5/23293; H04N 5/3572; H04N 5/23229; H04N 9/045; G06T 7/408; G06T 2207/10024; G06T 2207/10004; G06T 2207/10144
USPC ...... 348/342, 231.6, 273, 222.1, 275, 231.3, 348/223.1, 225.1
See application file for complete search history.

(56) References Cited

U.S. PATENT DOCUMENTS

| | | | |
|---|---|---|---|
| 6,831,687 B1 * | 12/2004 | Suzuki .................. | H04N 9/045 348/207.99 |
| 7,148,928 B2 | 12/2006 | Minakuti et al. | |
| 2003/0048374 A1 | 3/2003 | Minakuti et al. | |
| 2005/0195211 A1 * | 9/2005 | Park ....................... | H04N 9/643 345/600 |
| 2008/0303918 A1 * | 12/2008 | Keithley ................. | G09G 3/20 348/223.1 |
| 2010/0289962 A1 * | 11/2010 | Kim ........................ | G09G 5/02 348/649 |
| 2010/0321522 A1 * | 12/2010 | Seto ........................ | H04N 9/735 348/223.1 |
| 2011/0293174 A1 * | 12/2011 | Kim ........................ | H04N 9/735 382/162 |
| 2013/0155274 A1 * | 6/2013 | Yoshino ................. | H04N 9/735 348/223.1 |

(Continued)

FOREIGN PATENT DOCUMENTS

| | | |
|---|---|---|
| JP | 2003-078794 | 3/2003 |
| JP | 3841152 B2 | 1/2006 |

*Primary Examiner* — Xi Wang
(74) *Attorney, Agent, or Firm* — John C. Pokotylo; Pokotylo Patent Services (57) ABSTRACT

An interchangeable-lens imaging apparatus includes a color-temperature-information calculation circuit and a white-balance-gain calculation circuit. The color-temperature-information calculation circuit calculates color-temperature information on the basis of a first white balance gain associated with a first lens unit and first lens information of the first lens unit. The first white balance gain is calculated on the basis of a signal output from an image sensor. The white-balance-gain calculation circuit calculates a second white balance gain associated with a second lens unit that is different from the first lens unit on the basis of the color-temperature information and second lens information acquired from the second lens unit.

12 Claims, 9 Drawing Sheets

(56) References Cited

U.S. PATENT DOCUMENTS

| | | | |
|---|---|---|---|
| 2015/0009360 A1* | 1/2015 | Takasumi | H04N 5/23293 348/223.1 |
| 2015/0365612 A1* | 12/2015 | Wang | H04N 5/3572 348/223.1 |
| 2018/0315166 A1* | 11/2018 | Noyes | G06T 7/50 |

* cited by examiner

IMAGING APPARATUS AND METHOD OF CALCULATING WHITE BALANCE GAIN

CROSS REFERENCE TO RELATED APPLICATIONS

This application is based upon and claims the benefit of priority from prior Japanese Patent Application No. 2018-097141, filed May 21, 2018, the entire contents of which are incorporated herein by this reference.

BACKGROUND OF THE INVENTION

Field of the Invention

The disclosure herein relates to an imaging apparatus and a method of calculating a white balance gain.

Description of the Related Art

Lens units used for an interchangeable-lens camera each have different optical properties. Hence, to exactly reproduce the color of a subject in an image captured by an interchangeable-lens camera, image processing needs to be performed in consideration of the optical properties of a lens unit mounted on the camera body.

A technique related to such a problem is described in, for example, Japanese Laid-open Patent Publication No. 2003-078794. Japanese Laid-open Patent Publication No. 2003-078794 describes a digital camera that, when lens units are switched, acquires an ICC profile specific to a lens unit from a memory within this lens unit so as to perform a color correction process that depends on this lens unit.

SUMMARY OF THE INVENTION

An imaging apparatus in accordance with an aspect of the present invention is an interchangeable-lens imaging apparatus. The imaging apparatus includes an image sensor, a color-temperature-information calculation circuit, and a white-balance-gain calculation circuit. The color-temperature-information calculation circuit calculates color-temperature information on the basis of a first white balance gain associated with a first lens unit and first lens information of the first lens unit. The first white balance gain is calculated on the basis of a signal output from the image sensor. The white-balance-gain calculation circuit calculates a second white balance gain associated with a second lens unit that is different from the first lens unit on the basis of the color-temperature information and second lens information acquired from the second lens unit.

An imaging apparatus in accordance with another aspect of the invention is an interchangeable-lens imaging apparatus. The imaging apparatus includes an image sensor, a color-temperature-information calculation circuit, and a display that displays a color temperature of a light source on the basis of color-temperature information calculated by the color-temperature-information calculation circuit. The color-temperature-information calculation circuit calculates the color-temperature information on the basis of first lens information of a first lens unit and a first white balance gain associated with the first lens unit that is calculated on the basis of a signal output from the image sensor.

A white-balance-gain calculation method in accordance with an aspect of the invention is a white-balance-gain calculation method implemented by an interchangeable-lens imaging apparatus that includes an image sensor. The calculation method includes: calculating color-temperature information on the basis of first lens information of a first lens unit and a first white balance gain associated with the first lens unit that is calculated on the basis of a signal output from the image sensor; and calculating a second white balance gain associated with a second lens unit that is different from the first lens unit on the basis of the color-temperature information and second lens information acquired from the second lens unit.

BRIEF DESCRIPTION OF THE DRAWINGS

The present invention will be more apparent from the following detailed description when the accompanying drawings are referenced.

DESCRIPTION OF THE EMBODIMENTS

Japanese Laid-open Patent Publication No. 2003-078794 indicates that a color correction process is performed using an ICC profile after an appropriate white balance correction is made.

In general, a digital camera can calculate a white balance gain through a manual operation for shooting an image of a gray card. However, the calculated white balance gain is affected by the optical properties of a lens unit mounted when the image of the gray card was shot. Hence, when the lens unit is replaced with another, the white balance gain calculated through the manual operation will deviate from a proper setting.

Accordingly, the digital camera described in Japanese Laid-open Patent Publication No. 2003-078794 is such that although a color correction process that depends on a lens unit is performed using an ICC profile specific to the lens unit, switching the lens unit will decrease the reproducibility of the color of a subject.

The following describes embodiments of the present invention in consideration of the situation described above.

Figure 1:
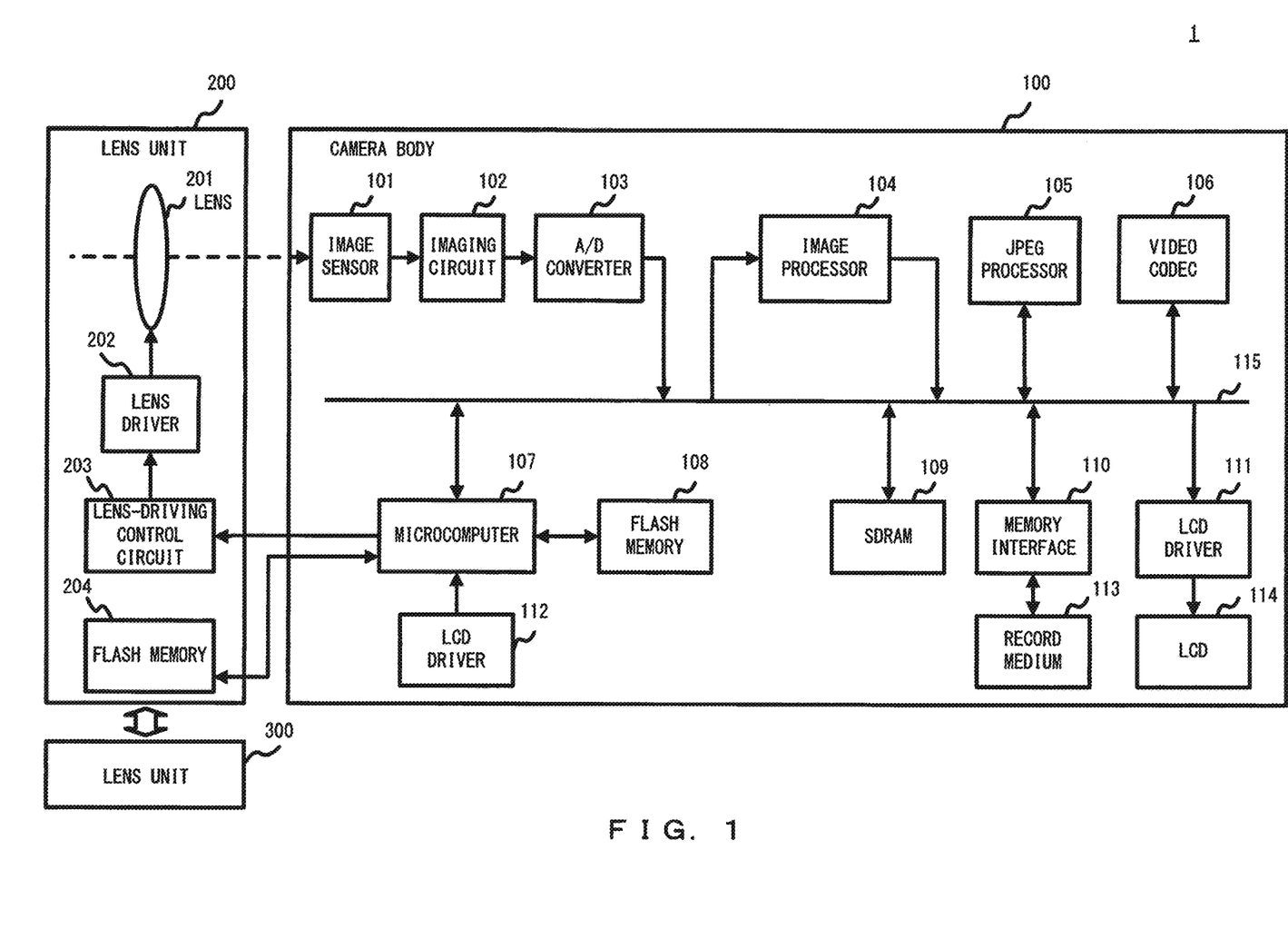
FIG. 1 illustrates an example of the configuration of a digital camera 1.

FIG. 1 illustrates an example of the configuration of a digital camera 1 in accordance with an embodiment. In the following, descriptions will be given of the configuration of the digital camera 1 by referring to FIG. 1.

The digital camera 1 depicted in FIG. 1 is an interchangeable-lens imaging apparatus and includes a camera body 100 and a lens unit 200 that can be attached to and detached from the camera body 100.

The lens unit 200 includes a lens 201, a lens driver 202, a lens-driving control circuit 203, and a flash memory 204. The camera body 100 may be mounted with a lens unit 300 instead of the lens unit 200. The lens unit 300 has a configuration similar to that of the lens unit 200. The lens unit 200 is a first lens unit of the digital camera 1, and the lens unit 300 is a second lens unit of the digital camera 1.

The lens 201 is a single-vision lens or a zoom lens and includes one or more optical lenses for forming an optical image of a subject. The lens 201 is moved in an optical-axis direction with a driving force of the lens driver 202. The lens-driving control circuit 203 adjusts a focal position of the lens 201 by controlling the lens driver 202 on the basis of a control signal from a microcomputer 107 (this microcomputer will be described hereinafter). When the lens 201 is a zoom lens, a focal length of the lens 201 can also be adjusted. The flash memory 204 stores lens information of the lens 201. Lens information, which includes at least spectral characteristics of a corresponding lens, is specific to this lens.

The camera body 100 includes an image sensor 101. The image sensor 101 is, for example, a CCD image sensor or a CMOS image sensor and includes a plurality of two-dimensionally arranged photodiodes each forming a pixel. The photodiode generates a current that depends on the amount of received light, thereby accumulating electrical charge in a capacitor connected to the photodiode. RGB filters in a Bayer arrangement are disposed on front surfaces of the plurality of photodiodes.

The configuration of the image sensor 101 is not limited to a configuration in which RGB filters in a Bayer arrangement are provided. The image sensor 101 may detect light rays having a plurality of colors in a manner such that these colors can be distinguished from each other. The image sensor 101 may have a configuration in which a plurality of sensors are arranged in the thickness direction of an element, e.g., FOVEON (a trademark of Foveon, Inc.)

The image sensor 101 is connected to an imaging circuit 102. The imaging circuit 102 reduces reset noise for a signal output from the image sensor 101 (hereinafter referred to as an analog image signal), then performs waveform shaping of the signal, and finally performs gain-up to achieve an appropriate luminance. The imaging circuit 102 is connected to an AD converter 103. The AD converter 103 converts an analog image signal into a digital signal. The resultant digital image signal (hereinafter referred to as image data) is output to a bus 115 and stored in a SDRAM 109. In particular, the digital camera 1 is such that the image sensor 101, the imaging circuit 102, and the AD converter 103 function together as an imaging unit that captures an image of a subject. Raw image data, i.e., image data before image processing performed by the image processor 104, is hereinafter referred to as RAW data on an as-needed basis.

The bus 115 is a transfer path for transferring various data read or generated within the camera body 100 between elements within the camera body 100. In addition to the AD converter 103, the bus 115 has connected thereto the image processor 104, a JPEG processor 105, a video codec 106, the microcomputer 107, the SDRAM 109, a memory interface 110, and a liquid crystal display (LCD) driver 111.

The image processor 104 performs image processing of RAW data. In addition, the image processor 104 calculates various adjustment values to be used for image processing. Details of the image processor 104 will be described hereinafter.

The JPEG processor 105 compresses image data read from the SDRAM 109 into JPEG image data according to a JPEG compression scheme and records the JPEG image data in a record medium 113 connected to the memory interface 110. The microcomputer 107 creates a JPEG file by providing the JPEG image data with a header necessary to configure the JPEG file. The microcomputer 107 records the created file in the record medium 113 via the memory interface 110.

The JPEG processor 105 also decompresses JPEG image data for image playback displaying. The decompressing is such that a file recorded in the record medium 113 is read and subjected to a decompression process performed by the JPEG processor 105 and the decompressed image data is temporarily stored in the SDRAM 109.

The video codec 106 compresses image data read from the SDRAM 109 into, for example, MPEG image data according to an MPEG compression scheme and records the MPEG image data in the record medium 113 connected to the memory interface 110. The microcomputer 107 creates an MPEG file by providing the MPEG image data with a header necessary to configure the MPEG file. The microcomputer 107 records the created file in the record medium 113 via the memory interface 110.

The video codec 106 also decompresses MPEG image data for image playback displaying. The decompressing is such that a file recorded in the record medium 113 is read and subjected to a decompression process performed by the video codec 106 and the decompressed image data is temporarily stored in the SDRAM 109.

The image compression scheme is not limited to the JPEG compression scheme or MPEG compression scheme described above. The digital camera 1 may use another compression scheme such as TIFF or H. 264.

The microcomputer 107 is a circuit that controls the entirety of the digital camera 1. The microcomputer 107 has a flash memory 108 and an operation part 112 connected thereto. The microcomputer 107 controls the entirety of the digital camera 1 on the basis of a program stored in the flash memory 108. The flash memory 108 stores various adjustment values such as a color matrix coefficient, a gamma table, and an exposure-condition determination table in addition to the program. The flash memory 108 may store lens information of a lens unit.

The SDRAM 109 is an electrically overwritable volatile memory for temporarily storing, for example, image data. The SDRAM 109 temporarily stores image data output from the AD converter 103 and image data processed by the image processor 104, the JPEG processor 105, or the video codec 106.

The memory interface 110 is connected to the record medium 113. The memory interface 110 writes/reads image data (including a header provided for the image data) to/from the record medium 113. For example, the record medium 113 is, but is not limited to, a memory card that can be attached to and detached from the camera body 100. The record medium 113 may be a nonvolatile memory or hard disk incorporated into the camera body 100.

The LCD driver 111 is connected to an LCD 114. The LCD driver 111 causes the LCD 114 to display an image on the basis of image data read from the SDRAM 109 or the record medium 113 and decompressed by the JPEG processor 105 or the video codec 106. For example, the LCD 114 may be provided on a back surface of the camera body 100.

The LCD 114 performs record view displaying of displaying, for only a short time, image data recorded after image shooting is performed and performs playback displaying or live-view displaying of an image file of still images or moving images recorded in the record medium 113. The LCD 114 is an exemplary display apparatus, and instead of the LCD 114, the digital camera 1 may use another display apparatus such as an organic EL display.

The operation part 112 includes various input buttons and input keys such as a power button, a release button, a moving image button, a playback button, a menu button, a D-pad, an OK button, and a mode dial. The operation part 112 senses operation states of these buttons and keys and outputs a result of the sensing to the microcomputer 107. On the basis of the result of the sensing output from the operation part 112, the microcomputer 107 performs various sequences that depend on user operations.

Figure 2:
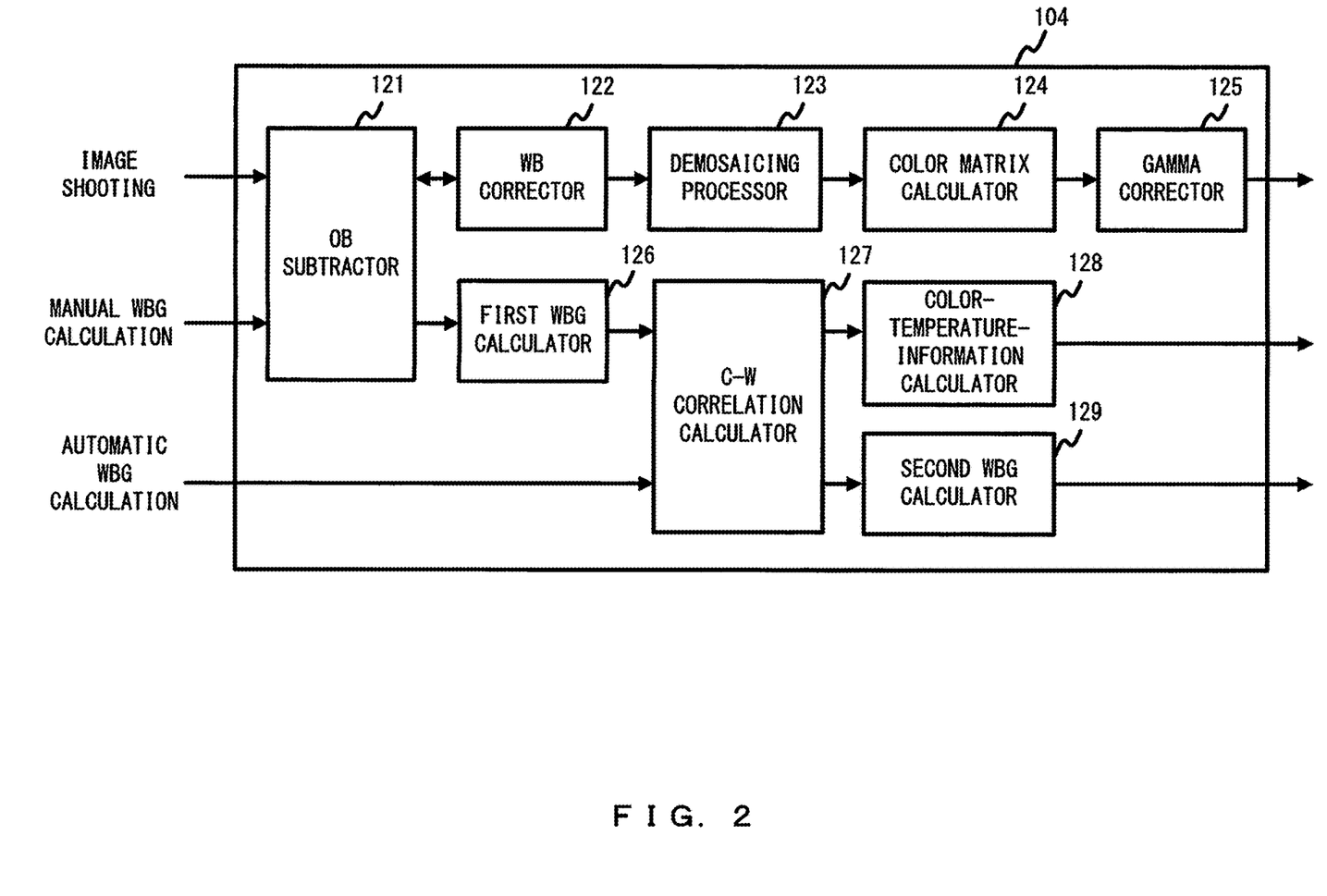
FIG. 2 illustrates an example of the configuration of an image processor 104.

FIG. 2 illustrates an example of the configuration of the image processor 104. The following describes the configuration of the image processor 104 by referring to FIG. 2.

The image processor 104 is circuitry that performs image processing and calculates an adjustment value to be used in the image processing. As depicted in FIG. 2, the image processor 104 includes an OB subtractor 121, a white balance (WB) corrector 122, a demosaicing processor 123, a color matrix calculator 124, a gamma corrector 125, a first white-balance-gain (WBG) calculator 126, a C-W correlation calculator 127, a color-temperature-information calculator 128, and a second white-balance-gain (WBG) calculator 129.

When a user of the digital camera 1 has performed an ordinary image-shooting operation, image data (RAW data) is read from the SDRAM 109 and processed sequentially by the OB subtractor 121, WB corrector 122, demosaicing processor 123, color matrix calculator 124, and gamma corrector 125 of the image processor 104. Image data processed by the image processor 104 is stored in the SDRAM 109.

The OB subtractor 121 subtracts an optical black (OB) value resulting from, for example, a dark current of the image sensor 101 from a pixel value of each pixel constituting image data.

The WB corrector 122 corrects a white balance of image data processed by the OB subtractor 121. More particularly, the WB corrector 122 reads a white balance gain (including R gain and B gain) associated with a lens unit mounted on the camera body 100 from the SDRAM 109. A pixel value that corresponds to R is amplified using a white-balance-gain component associated with R (hereinafter referred to as a R gain) that is included in the white balance gain. A pixel value that corresponds to B is amplified using a white balance gain component associated with B (hereinafter referred to as a B gain) that is included in the white balance gain. Accordingly, the white balance of image data is corrected.

More particularly, when the lens unit 200 is mounted on the camera body 100, the WB corrector 122 corrects the white balance of image data generated from image shooting performed with the lens unit 200 on the basis of a white balance gain associated with the lens unit 200. When the lens unit 300 is mounted on the camera body 100, the WB corrector 122 corrects the white balance of image data generated from image shooting performed with the lens unit 300 on the basis of a white balance gain associated with the lens unit 300.

The demosaicing processor 123 calculates, through interpolation, data on a missing color from image data processed by the OB subtractor 121. More specifically, for each pixel, data on a color that the pixel is missing is calculated by interpolating data on this color that neighboring pixels have. Note that the demosaicing processor 123 may be omitted when RAW data includes data on a plurality of colors for each single pixel, e.g., when an image sensor based on the FOVEON (a trademark of Foveon, Inc.) scheme is used as the image sensor 101.

The color matrix calculator 124 multiplies image data processed by the demosaicing processor 123 by a color matrix coefficient read from the flash memory 108 so as to correct the color of the image data. A plurality of color matrix coefficients are stored in the flash memory 108 in advance. The color matrix calculator 124 selects one color matrix coefficient for use from the plurality of color matrix coefficients on the basis of a color temperature calculated using a manual WBG calculation method (this method will be described hereinafter). A color temperature is measured in Kelvin (K).

The gamma corrector 125 performs a gamma correction of image data processed by the color matrix calculator 124. More particularly, the luminance of each pixel is adjusted using a gamma table stored in the flash memory 108.

When the user of the digital camera 1 has performed an operation of shooting an image of a gray card so as to calculate a white balance gain, image data (RAW data) is read from the SDRAM 109 and processed sequentially by the OB subtractor 121, first WBG calculator 126, C-W correlation calculator 127, and color-temperature-information calculator 128 of the image processor 104. A white balance gain calculated by the first WBG calculator 126 and color-temperature information calculated by the color-temperature-information calculator 128 are correlated with lens information of a mounted lens and stored in the flash memory 108. A subject for which an image is to be shot is not limited to a gray card but may be a medium of an achromatic color. A process of calculating a white balance gain by shooting an image of a medium of an achromatic color will hereinafter be referred to as a manual WBG calculation process.

The first WBG calculator 126 calculates a white balance gain (WBG) from image data processed by the OB subtractor 121. More particularly, the first WBG calculator 126 calculates a white balance gain (WBG) associated with a lens unit mounted on the camera body 100 on the basis of data on a region that corresponds to a gray card among the image data. The white balance gain calculated by the first WBG calculator 126 includes a plurality of white-balance-gain components that correspond to a plurality of colors. In particular, the white balance gain includes a R gain and B gain that are components corresponding to R and B among RGB that can be distinguished from each other by the image sensor 101. The R gain and the B gain are each a gain defined with reference to G and may be referred to as a R/G gain and a B/G gain.

On the basis of lens information of a lens unit (e.g., lens unit 200) mounted on the camera body 100, the C-W correlation calculator 127 calculates a correlation between a color temperature (C) and a white balance gain (W) for this lens unit. Lens information may be acquired from a lens unit mounted on the camera body 100 or may be acquired from the flash memory 108 when the flash memory 108 stores lens information of a lens unit mounted on the camera body 100.

The C-W correlation calculator 127 first calculates white balance gain components relevant to predetermined color temperatures for each of R and B. A point on a color-temperature-white-balance-gain space indicated by a combination of a predetermined color temperature and a white balance gain relevant to this color temperature will hereinafter be referred to as a preset point. A color temperature associated with R and a color temperature associated with B will hereinafter be referred to as a R color temperature and a B color temperature, respectively. Then, the C-W correlation calculator 127 calculates a correlation between a color temperature and the white balance gain for each of R and B by interpolating preset points. The C-W correlation calculator 127 may further calculate a correlation between a reciprocal color temperature and the white balance gain. A reciprocal color temperature is measured in mired ($\mu K^{-1}$).

The color-temperature-information calculator 128 calculates color-temperature information on the basis of the white balance gain calculated by the first WBG calculator 126 and the correlation calculated by the C-W correlation calculator 127. Color-temperature information refers to information that includes at least one of a color temperature or a reciprocal color temperature.

When the user of the digital camera 1 performs an operation of replacing a lens unit with another, processing is performed sequentially by the C-W correlation calculator 127 and second WBG calculator 129 of the image processor 104. A White balance gain calculated by the second WBG calculator 129 is stored in the flash memory 108.

The C-W correlation calculator 127 calculates a correlation between a color temperature (C) and a white balance gain (W) for a lens unit mounted on the camera body 100 after the replacement. The calculation is performed using the method described above.

The second WBG calculator 129 calculates a white balance gain on the basis of color-temperature information stored in the flash memory 108 that has been calculated by the color-temperature-information calculator 128 and a correlation calculated by the C-W correlation calculator 127. The white balance gain calculated by the second WBG calculator 129 includes a plurality of white-balance-gain components that correspond to a plurality of colors. In particular, the white balance gain includes a R gain and B gain, as in the case of the first WBG calculator 126.

The digital camera 1 configured as described above calculates color-temperature information in a manual WBG process. When a lens unit is replaced with another, a white balance gain is recalculated using the color-temperature information. Hence, a manual WBG process does not need to be performed for each lens unit, and an appropriate white balance correction can be made for any lens unit.

The following describes processing performed by the digital camera 1 more specifically by referring to FIGS. 3 to FIG. 9B.

Figure 3:
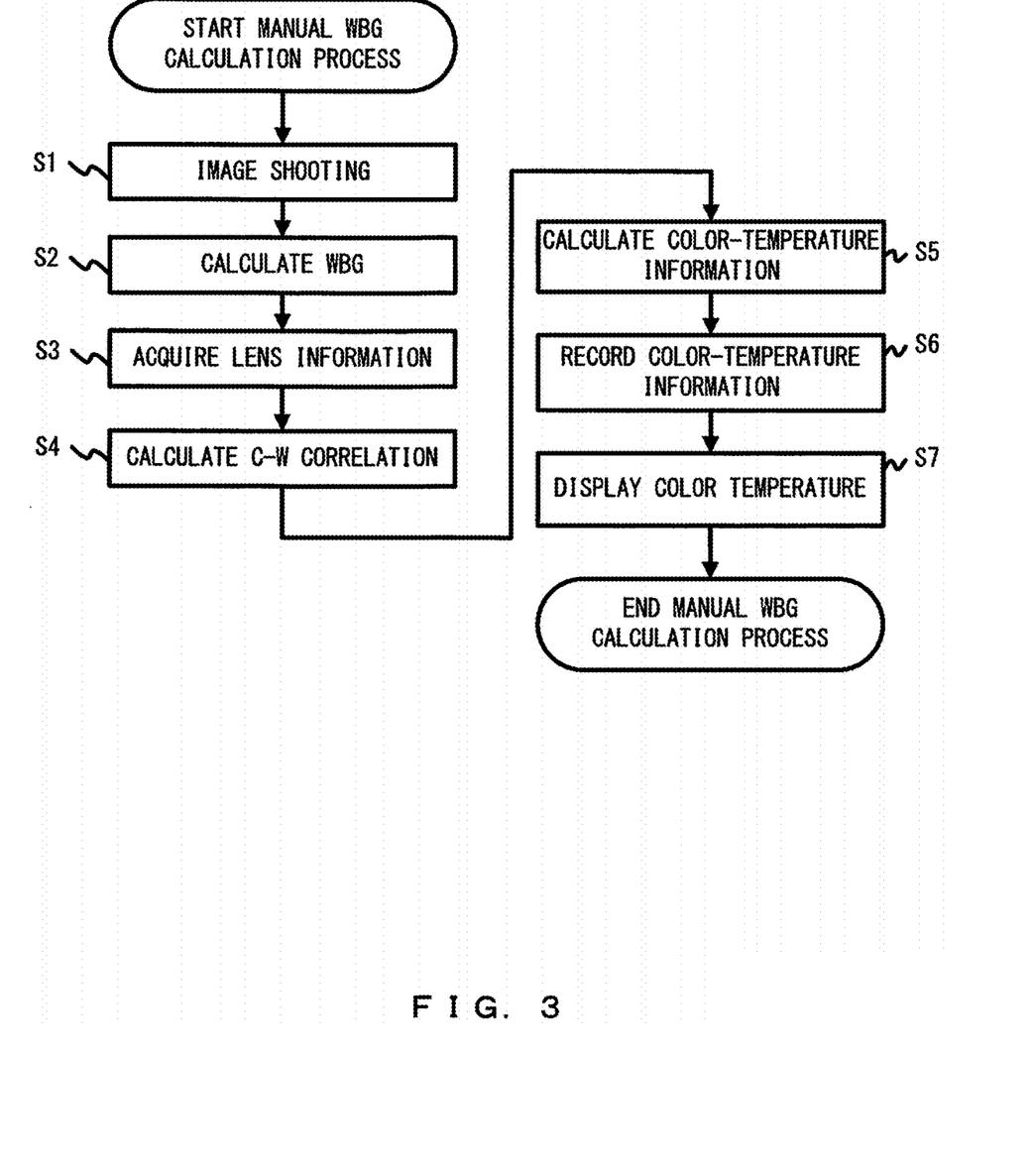
FIG. 3 is a flowchart illustrating an example of a manual WBG calculation process.
Figure 4A:
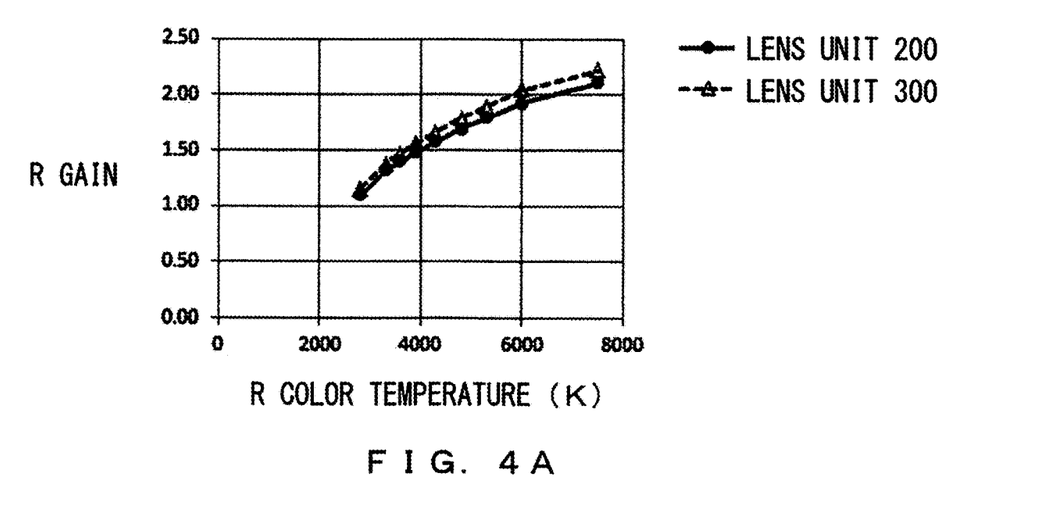
FIG. 4A illustrates a correlation between R gain and R color temperature for each lens unit.
Figure 4B:
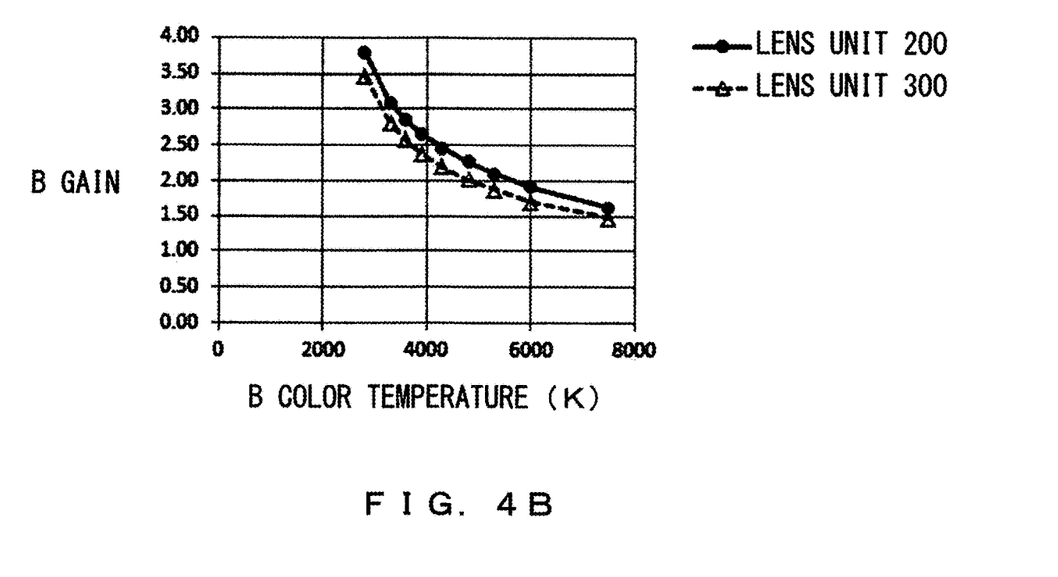
FIG. 4B illustrates a correlation between B gain and B color temperature for each lens unit.
Figure 5A:
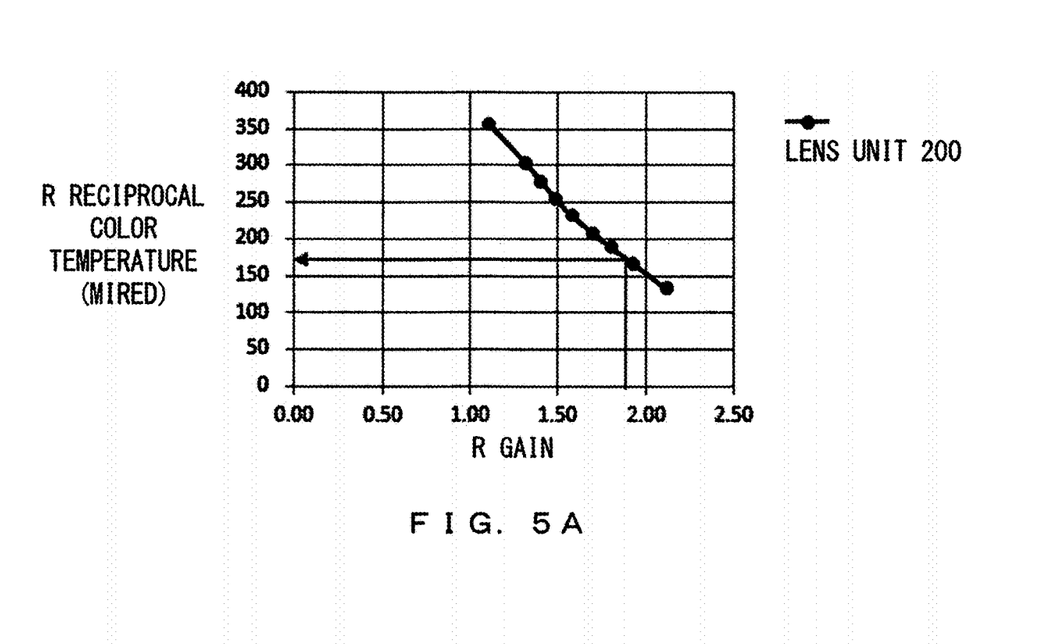
FIG. 5A illustrates a correlation between R gain and R reciprocal color temperature for a lens unit 200.
Figure 5B:
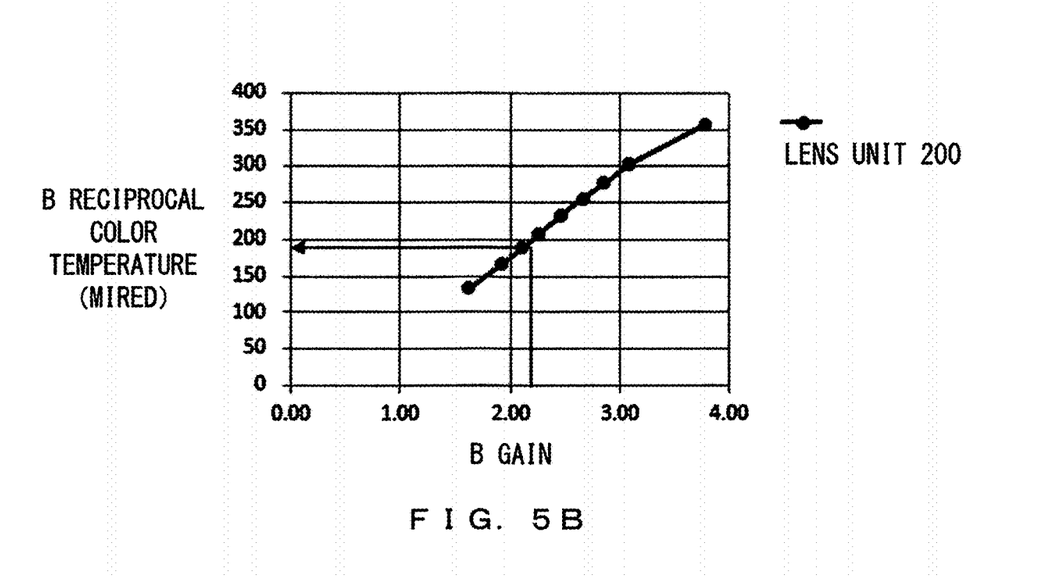
FIG. 5B illustrates a correlation between B gain and B reciprocal color temperature for a lens unit 200.
Figure 6:
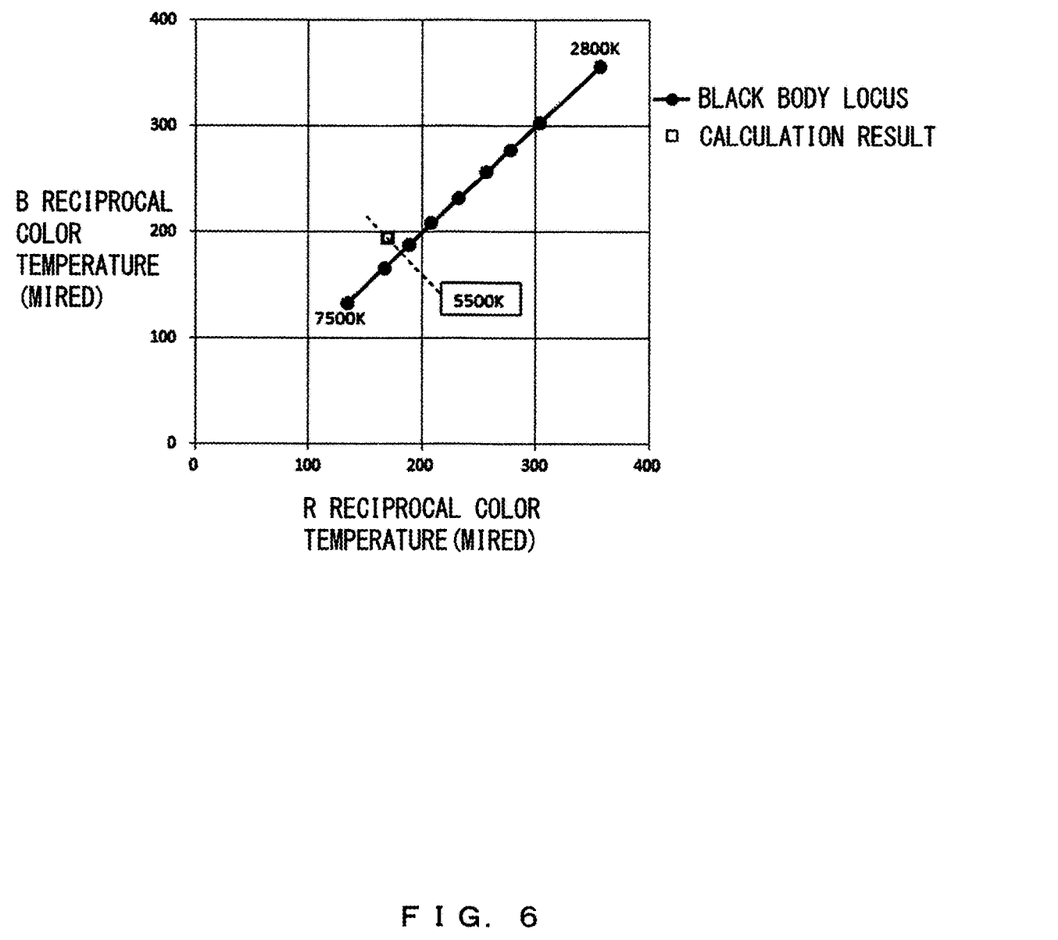
FIG. 6 is an explanatory diagram for a color-temperature conversion method.
Figure 7:
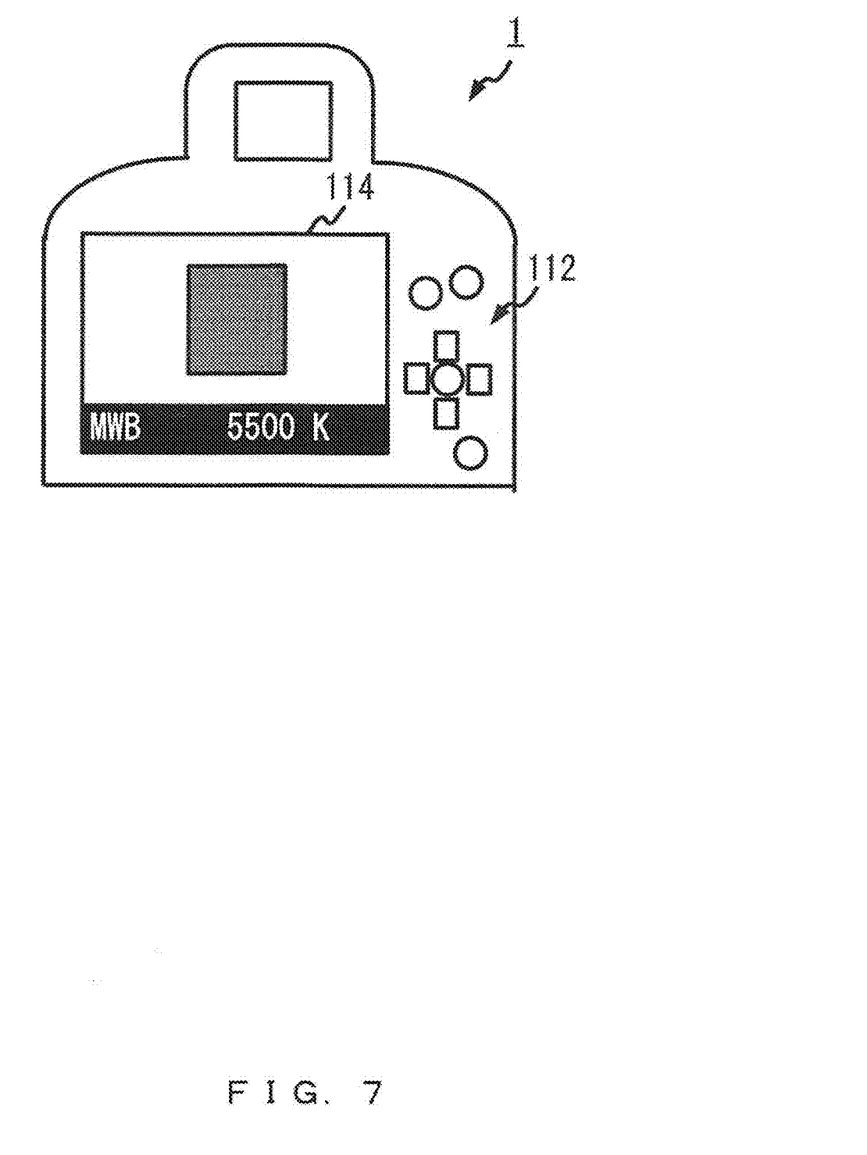
FIG. 7 illustrates an example of how a color temperature is displayed.

FIG. 3 is a flowchart illustrating an example of a manual WBG calculation process. FIG. 4A illustrates a correlation between R gain and R color temperature for each lens unit. FIG. 4B illustrates a correlation between B gain and B color temperature for each lens unit. FIG. 5A illustrates a correlation between R gain and R reciprocal color temperature for a lens unit 200. FIG. 5B illustrates a correlation between B gain and B reciprocal color temperature for the lens unit 200. FIG. 6 is an explanatory diagram for a color-temperature conversion method. FIG. 7 illustrates an example of how a color temperature is displayed. First, by referring to FIGS. 3-7, detailed descriptions will be given of a manual WBG process with reference to an example in which the lens unit 200 is mounted on the camera body 100.

When the manual WBG calculation process depicted in FIG. 3 is started, the digital camera 1 shoots an image of a subject in accordance with an instruction from a user (step S1). For example, an image of a gray card may be shot, and the digital camera 1 may store RAW data in the SDRAM 109.

The digital camera 1 calculates a white balance gain (step S2). In this example, on the basis of the RAW data read from the SDRAM 109, the image processor 104 calculates a white balance gain associated with the lens unit 200 mounted on the camera body 100. In other words, the image processor 104 calculates a white balance gain associated with the lens unit 200 on the basis of a signal output from the image sensor 101. The calculated white balance gain is stored in the flash memory 108.

More specifically, the OB subtractor 121 first subtracts an OB value from a pixel value of RAW data, and the first WBG calculator 126 then calculates a white balance gain associated with the lens unit 200 from image data processed by the OB subtractor 121. In this way, a white balance gain for appropriately correcting a white balance for a combination of the light source and the lens unit 200 that was used in the image shooting in step S1 is calculated.

The white balance gain includes a R gain and a B gain that are each a white-balance-gain component. In particular, the white balance gain includes a plurality of white-balance-gain components that correspond to a plurality of colors.

To clarify the difference from a white balance gain calculated in an automatic WBG process (this process will be described hereinafter), a white balance gain calculated in the manual WBG process may hereinafter be referred to as a first white balance gain on an as-needed basis. A white balance gain calculated in the automatic WBG process may hereinafter be referred to as a second white balance gain on an as-needed basis.

When white balance gain is calculated, the digital camera 1 acquires lens information of the lens unit 200 mounted on the camera body 100 (step S3). For example, lens information specific to the lens unit 200 may be read from the flash memory 204 of the lens unit 200 and stored in the SDRAM 109. Note that lens information of the lens unit 200 is an example of the first lens information.

The digital camera 1 calculates a correlation between a color temperature and a white balance gain for the lens unit 200 (step S4). In this example, the C-W correlation calculator 127 of the image processor 104 calculates a plurality of preset points on the basis of the lens information acquired in step S3 and performs interpolation using the plurality of preset points so as to calculate a correlation between a color temperature and a white balance gain for the lens unit 200. The correlation is calculated for each of R and B.

FIG. 4A indicates the correlation calculated in step S4 for the lens unit 200 with reference to R. FIG. 4B indicates the correlation calculated in step S4 for the lens unit 200 with reference to B. FIGS. 4A and 4B also depict correlations for the lens unit 300 so as to clarify the difference in correlation between the lens units.

In step S4, a correlation between a reciprocal color temperature and a white balance gain may be calculated in addition to a correlation between a color temperature and a white balance gain. FIGS. 5A and 5B each indicate the correlation between reciprocal color temperature and white balance gain calculated for the lens unit 200 in step S4. FIG. 5A depicts a correlation for R, and FIG. 5B depicts a correlation for B.

A color temperature and a white balance gain have a nonlinear relationship therebetween, as depicted in FIGS. 4A and 4B. By contrast, a reciprocal color temperature and a white balance gain have an approximately linear relationship therebetween, as depicted in FIGS. 5A and 5B. Hence, the relationship between a reciprocal color temperature and a white balance gain allows interpolation for calculating a correlation to be more precisely performed than the relationship between a color temperature and a white balance gain, so that a precise correlation can be calculated with the relationship between a reciprocal color temperature and a white balance gain. Hence, a correlation between a reciprocal color temperature and a white balance gain is desirably calculated in step S4.

When a correlation is calculated, the digital camera 1 calculates color-temperature information (step S5). In this example, the color-temperature-information calculator 128 of the image processor 104 calculates color-temperature information on the basis of the white balance gain calculated for the lens unit 200 in step S2 and the correlation calculated in step S4. The correlation calculated in step S4 is one calculated from lens information of the lens unit 200. This means that the color-temperature-information calculator 128 calculates color-temperature information on the basis of a white balance gain associated with the lens unit 200 and lens information of the lens unit 200.

Assume, for example, that a R gain of 1.85 and a B gain of 2.2 are calculated in step S2. In this case, in step S5, the color-temperature-information calculator 128 calculates a R reciprocal color temperature of 174 mireds from the correlation depicted in FIG. 5A and a B reciprocal color temperature of 190 mireds from the correlation depicted in FIG. 5B. In particular, the color-temperature-information calculator 128 calculates a plurality of color-temperature-information components (R reciprocal color temperature and B reciprocal color temperature) on the basis of a plurality of white-balance-gain components (R gain and B gain) and lens information of the lens unit 200. In addition, the color-temperature-information calculator 128 converts the average of the R reciprocal color temperature and the B reciprocal color temperature (182 mireds) into a color temperature. As 1 mired is 1 $\mu K^{-1}$, a reciprocal color temperature of 182 mireds is a color temperature of 5500 K.

As described above, the color-temperature information calculated in step S5 includes a R reciprocal color temperature and B reciprocal color temperature that are a plurality of color-temperature-information components corresponding to a plurality of colors and also includes a color temperature.

As depicted in FIG. 6, the abovementioned calculation of a color temperature from a R reciprocal color temperature and a B reciprocal color temperature is equivalent to determining a color temperature for a point of intersection of a black body locus and a line normal to this black body locus that extends from a point (calculation result) indicating the calculated R reciprocal color temperature and B reciprocal color temperature.

The digital camera 1 stores the calculated color-temperature information in the flash memory 108 (step S6). In this example, color-temperature-information components relevant to R and B (e.g., R reciprocal color temperature and B reciprocal color temperature) and a color temperature are desirably stored in the flash memory 108. This is because storing a color temperature alone would lead to information on the properties of the light source being partly lost when these properties deviate from the black body locus. Storing a plurality of color-temperature-information components allows more accurate properties of the light source to be stored. Accordingly, more appropriate white balance gain can be calculated in an automatic WBG calculation process (this process will be described hereinafter).

The digital camera 1 displays a color temperature on the LCD 114 on the basis of the color-temperature information calculated in step S5 (step S7) and ends the manual WBG calculation process depicted in FIG. 3. FIG. 7 depicts a situation in which a color temperature is displayed on the LCD 114. In this situation, the user of the digital camera 1 can grasp the color temperature of the light source in an image-shooting environment at that time.

By performing the manual WBG calculation process depicted in FIG. 3, the digital camera 1 can calculate a white balance gain for appropriately correcting a white balance for a combination of a light source in an image-shooting environment at that time and a lens unit mounted on the camera body 100. Meanwhile, calculating the color temperature of a light source in an image-shooting environment at that time allows the properties of the light source to be recorded. In particular, a plurality of white-balance-gain components that correspond to a plurality of colors may be calculated, and a plurality of color-temperature-information components may be calculated using the plurality of white balance components so that more accurate properties of the light source can be recorded.

Figure 8:
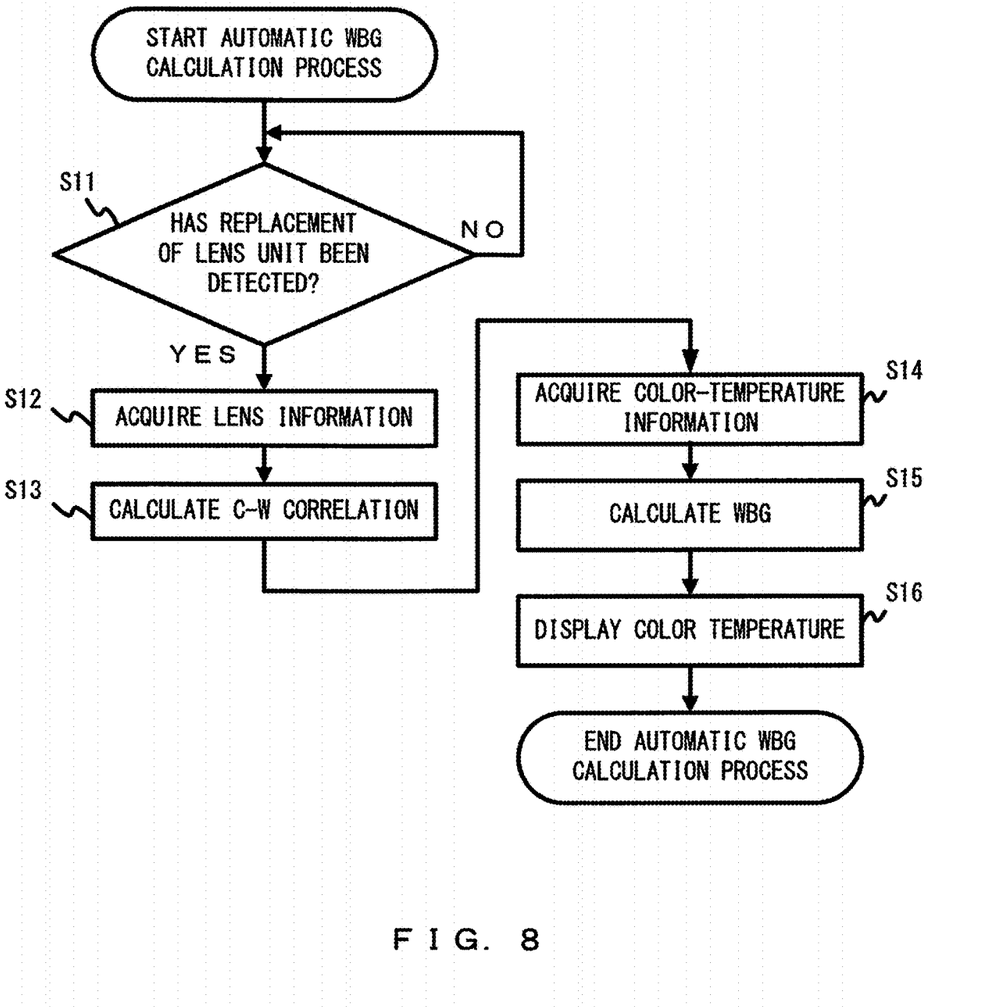
FIG. 8 is a flowchart illustrating an example of an automatic WBG calculation process.
Figure 9A:
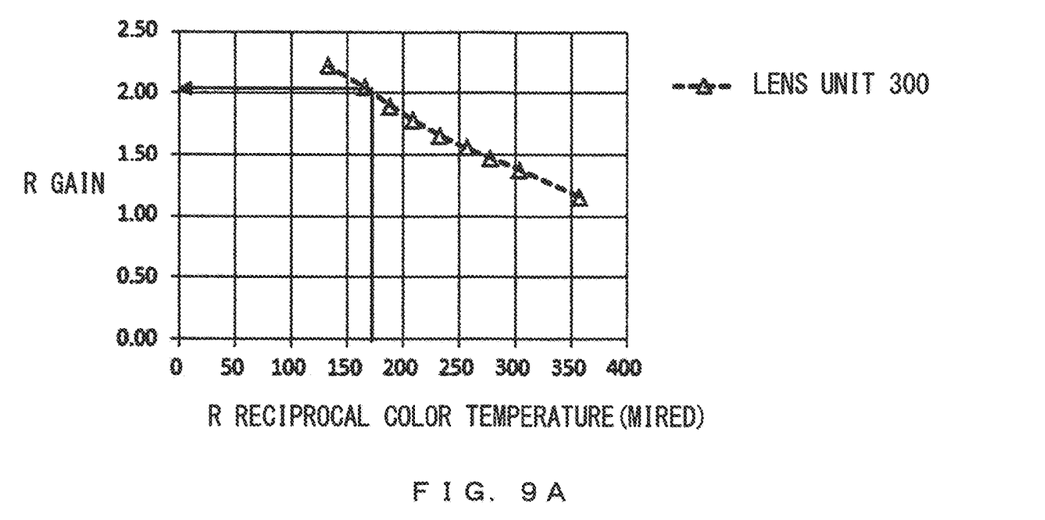
FIG. 9A illustrates a correlation between R gain and R reciprocal color temperature for a lens unit 300.
Figure 9B:
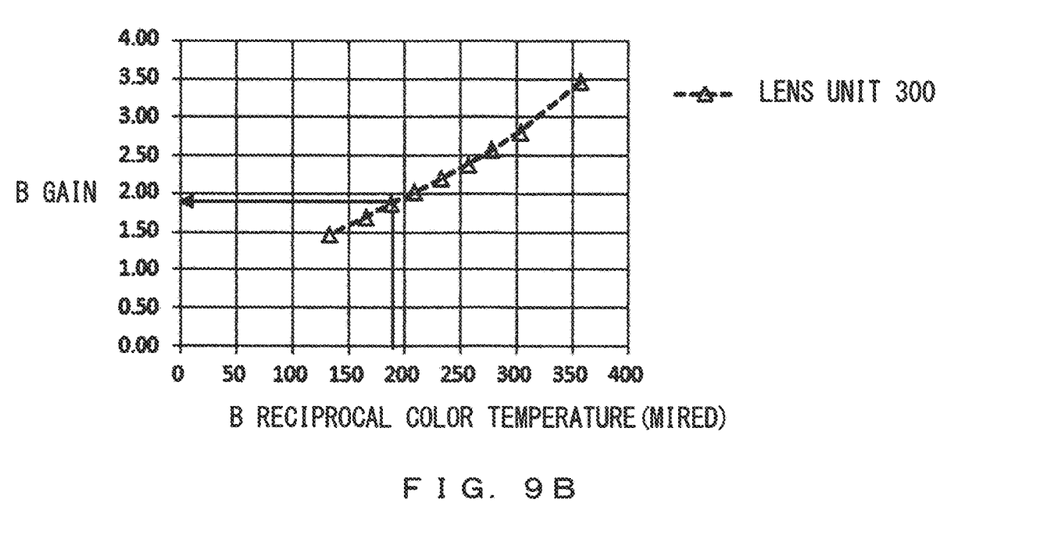
FIG. 9B illustrates a correlation between B gain and B reciprocal color temperature for a lens unit 300.

FIG. 8 is a flowchart illustrating an example of an automatic WBG calculation process. FIG. 9A illustrates a correlation between R gain and R reciprocal color temperature for the lens unit 300. FIG. 9B illustrates a correlation between B gain and B reciprocal color temperature for the lens unit 300. The following describes the automatic WBG process in detail by referring to FIG. 8 to FIG. 9B. The automatic WBG process is a process of calculating a white balance gain without performing image shooting, unlike in the case of the manual WBG process, and is performed under a condition in which a color temperature is stored in the flash memory 108 through the manual WBG process.

When the automatic WBG calculation process depicted in FIG. 8 is started, the digital camera 1 monitors replacement of a lens unit (step S11). Upon detecting that the lens unit has been replaced with another, the digital camera 1 acquires lens information of the lens unit 300 after the replacement (step S12). Descriptions will be given of an example in which the lens unit mounted on the camera body 100 has been switched from the lens unit 200 to the lens unit 300. In this situation, for example, lens information specific to the lens unit 300 may be read from the flash memory of the lens unit 300 and stored in the SDRAM 109 in step S12. Note that the lens information of the lens unit 300 is an example of the second lens information.

The digital camera 1 calculates a correlation between a color temperature and a white balance gain for the lens unit 300 (step S13). This process is similar to the process of step S4 depicted in FIG. 3 except for the fact that the lens information acquired in step S12 is used instead of the lens information acquired in step S3.

FIGS. 9A and 9B each indicate the correlation between an reciprocal color temperature and a white balance gain calculated for the lens unit 300 in step S13. FIG. 9A depicts a correlation for R, and FIG. 9B depicts a correlation for B.

The digital camera 1 acquires color-temperature information from the flash memory 108 (step S14). In this example, the color-temperature information (R reciprocal color temperature and B reciprocal color temperature) recorded in step S6 is read from the flash memory 108 and stored in the SDRAM 109.

In addition, the digital camera 1 calculates a white balance gain for the lens unit 300 mounted on the camera body 100 (step S15). In this example, the second WBG calculator 129 of the image processor 104 calculates a white balance gain component for each of R and B on the basis of the color-temperature information acquired in step S14 and the correlation calculated in step S13. In particular, the white balance gain calculated in step S15 includes a R gain and B gain that are a plurality of white balance gain components corresponding to a plurality of colors. The correlation calculated in step S13 is one calculated from the lens information of the lens unit 300. This means that the second WBG calculator 129 calculates a white balance gain associated with the lens unit 300 on the basis of color-temperature information and the lens information of the lens unit 300.

Assume, for example, that a R inversion color temperature of 174 mireds and a B inversion color temperature of 190 mireds are obtained in step S14. In this case, in step S15, the second WBG calculator 129 calculates a R gain of 2.05 from the correlation depicted in FIG. 9A and a B gain of 1.9 from the correlation depicted in FIG. 9B. In particular, the second WBG calculator 129 calculates a plurality of white-balance-gain components (R gain and B gain) on the basis of a plurality of color-temperature-information components (R reciprocal color temperature and B reciprocal color temperature) and the lens information of the lens unit 300.

The digital camera 1 displays the color temperature acquired in step S14 on the LCD 114 (step S16) and ends the automatic WBG calculation process depicted in FIG. 8. Since the LCD 114 also displays a color temperature in the automatic WBG calculation process, the user of the digital camera 1 can check that a white balance gain has been calculated at the same color temperature as that in the manual WBG calculation process.

By performing the automatic WBG calculation process depicted in FIG. 8, the digital camera 1 can calculate, without performing image shooting, a white balance gain for appropriately correcting a white balance for a combination of a light source in an image-shooting environment at that time and a lens unit mounted on the camera body 100. Hence, the white balance gain can be automatically updated to an appropriate value that depends on a lens unit.

Accordingly, the digital camera 1 and the white-balance-gain calculation methods indicated in FIGS. 3 and 8 allow an appropriate white-balance-gain correction to be made for any lens unit.

The described embodiments indicate specific examples to facilitate the understanding of the invention, and the invention is not limited to these. The present invention is also applicable to the switching of the objective of a digital microscope. The imaging apparatus and the white-balance calculation method can be variously modified or changed without departing from the claim recitations.

In the example indicated in FIG. 8, replacement of a lens unit is monitored, and when the replacement is detected, the subsequent processes are performed. However, irrespective of whether a lens unit has been replaced with another, the processes of step S12 and the following steps may be periodically or nonperiodically performed. Also in this case, advantageous effects similar to those in the process of FIG. 8 can be achieved.

What is claimed is:

1. An interchangeable-lens imaging apparatus comprising:
an image sensor;
a color-temperature-information calculation circuit that calculates color-temperature information on the basis of a first white balance gain associated with a first lens unit and first lens information of the first lens unit, the first white balance gain being calculated on the basis of a signal output from the image sensor; and
a white-balance-gain calculation circuit that calculates a second white balance gain associated with a second lens unit that is different from the first lens unit on the basis of the color-temperature information and second lens information acquired from the second lens unit.

2. The interchangeable-lens imaging apparatus of claim 1, wherein
the image sensor detects light rays having a plurality of colors in a manner such that these colors are capable of being distinguished from each other,
the first white balance gain includes a plurality of first white-balance-gain components that correspond to the plurality of colors,
the color-temperature information includes a plurality of color-temperature-information components that correspond to the plurality of colors, and
the color-temperature-information calculation circuit calculates the plurality of color-temperature-information components on the basis of the plurality of first white-balance-gain components and the first lens information.

3. The interchangeable-lens imaging apparatus of claim 2, wherein
the second white balance gain includes a plurality of second white-balance-gain components that correspond to the plurality of colors, and
the white-balance-gain calculation circuit calculates the plurality of second white-balance-gain components on the basis of the plurality of color-temperature-information components and the second lens information.

4. The interchangeable-lens imaging apparatus of claim 2, wherein
the plurality of color-temperature-information components are each an reciprocal color temperature.

5. The interchangeable-lens imaging apparatus of claim 1, further comprising:
a white-balance correction circuit that corrects a white balance of image data, wherein
the white-balance correction circuit
corrects the white balance of image data generated from image shooting performed with the first lens unit on the basis of the first white balance gain, and
corrects the white balance of image data generated from image shooting performed with the second lens unit on the basis of the second white balance gain.

6. The interchangeable-lens imaging apparatus of claim 1, further comprising:
a display that displays a color temperature of a light source on the basis of the color-temperature information calculated by the color-temperature-information calculation circuit.

7. A white-balance-gain calculation method implemented by an interchangeable-lens imaging apparatus that includes an image sensor, the white-balance-gain calculation method comprising:
calculating color-temperature information on the basis of first lens information of a first lens unit and a first white balance gain associated with the first lens unit that is calculated on the basis of a signal output from the image sensor; and
calculating a second white balance gain associated with a second lens unit that is different from the first lens unit on the basis of the color-temperature information and second lens information acquired from the second lens unit.

8. The white-balance-gain calculation method of claim 7, wherein
the first white balance gain includes a plurality of first white-balance-gain components that correspond to a plurality of colors,
the color-temperature information includes a plurality of color-temperature-information components that correspond to the plurality of colors,
the white-balance-gain calculation method further comprises detecting, by the image sensor, light rays having the plurality of colors in a manner such that these colors are capable of being distinguished from each other, and
the calculating of the color-temperature information includes calculating the plurality of color-temperature-information components on the basis of the plurality of first white-balance-gain components and the first lens information.

9. The white-balance-gain calculation method of claim 8, wherein
the second white balance gain includes a plurality of second white-balance-gain components that correspond to the plurality of colors, and
the calculating of the second white balance gain includes calculating the plurality of second white-balance-gain components on the basis of the plurality of color-temperature-information components and the second lens information.

10. The white-balance-gain calculation method of claim 8, wherein
the plurality of color-temperature-information components are each an reciprocal color temperature.

11. The white-balance-gain calculation method of claim 7, further comprising:
correcting a white balance of image data generated from image shooting performed with the first lens unit on the basis of the first white balance gain; and
correcting a white balance of image data generated from image shooting performed with the second lens unit on the basis of the second white balance gain.

12. The white-balance-gain calculation method of claim 7, further comprising:
displaying a color temperature of a light source on the basis of the color-temperature information calculated by the color-temperature-information calculation circuit.

* * * * *